Oct. 16, 1951     D. M. MORGENSTERN     2,571,375
VEHICLE LAMP HELD IN POSITION BY RESILIENT CLAMPS
Filed Feb. 9, 1948
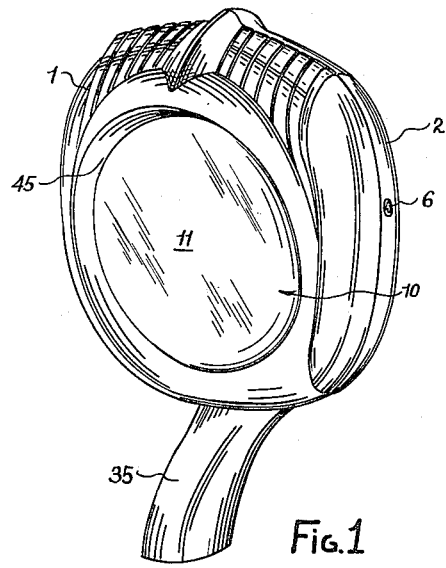
Fig. 1
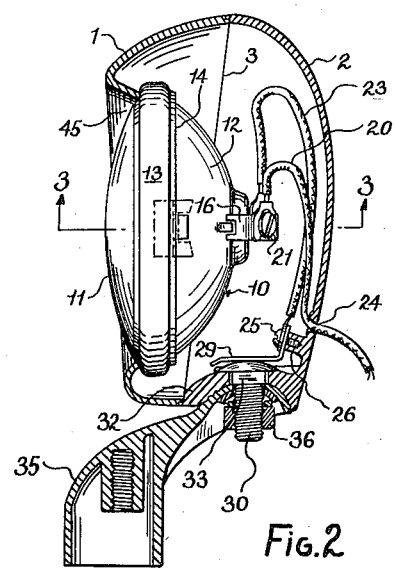
Fig. 2
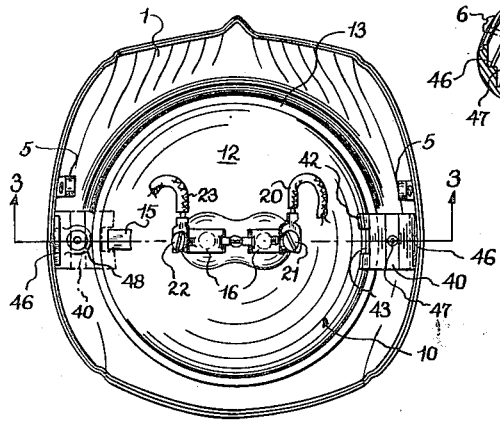
Fig. 3
Fig. 4
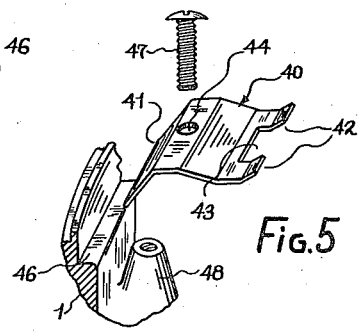
Fig. 5
INVENTOR.
David M. Morgenstern
BY
West & Oldham
ATTORNEYS Patented Oct. 16, 1951

2,571,375

UNITED STATES PATENT OFFICE 2,571,375

VEHICLE LAMP HELD IN POSITION BY RESILIENT CLAMPS

David M. Morgenstern, Cleveland, Ohio

Application February 9, 1948, Serial No. 7,116

3 Claims. (Cl. 240—41.5)

1

This invention relates to vehicle lamps, and more particularly to an improved lamp casing for use with the prevailing type of sealed-beam lighting unit that comprises a lens, a reflector, and a circumferential bead or enlargement between the peripheral portion of the lens and the corresponding part of the reflector, all being integral and of glass. Incidentally, the device of my present invention is intended especially for use as a fog light, and accordingly a sealed-beam unit is employed which incorporates an amber colored lens.

The general object of the invention is to produce a very attractive yet relatively inexpensive lamp casing that consists of few parts that are convenient of assembly, requiring the minimum number of fastening means to hold the assembly together, and which is strong and durable in service.

Another and more limited object of the invention is the provision of a lamp casing that is composed of a front frame-like member, and a rear member or shell, each preferably consisting of a die casting of artistic shape and ornamental design and wherein the sealed-beam lighting unit is attached by simple, desirably resilient, clamping means to the front member, and the front member is connected to the rear member or shell by a minimum number of fastening means or screws. This construction greatly facilitates assembly in that the lighting unit may be mounted and its electrical connections made while the casing is disassembled, and thereafter the front member may be applied to the rear member or shell and the fastening means inserted by which the two casing members are held together. Also, by using resilient clamping means, liability of breakage of the all-glass lighting unit is minimized, both during installation, by relieving it of undue strains, and during use, by lessening the force of impingement of any object striking the lens.

A further object of the invention is to provide an attaching arm or bracket that is connected to the casing on a substantially vertical axis about which the arm or bracket is capable of adjustment through a complete circuit and which connection, also, is in the nature of a ball and socket joint having a limited range of movement so that the casing may be tilted with respect to the bracket for "aiming" purposes.

Further objects will appear as I proceed to describe the invention in detail by reference to the accompanying drawing wherein like reference characters designate like parts throughout the several views.

2

In the drawing, Fig. 1 is a perspective view of my improved lamp; Fig. 2 is a central vertical section through the same; Fig. 3 is a horizontal section, substantially on the lines 3—3 of Figs. 2 and 4, the view being taken as though looking upwardly so as to show the fastening means for holding the front and rear members of the casing together, and Fig. 5 is an exploded perspective view including one of the clamps for attaching the lighting unit to the casing, the screw for use therewith, and a fragment of the casing in the region of the clamp.

The front frame-like member of the casing is designated 1, and the rear member or shell, 2; and the abutting edges of the two members are reversely or complementarily rabbeted so as to produce an overlapping joint at 3. Lugs 5 project rearwardly from the opposite sides of the member 1 into the member or shell 2, and threaded apertures therein receive screws 6 that extend freely through holes in the sides of the member or shell. As appears from Fig. 3, the screws are substantially normal to the outer surface of the member or shell wherewith the heads of the screws engage so that the screws are inclined forwardly, and this angular disposition of the screws causes the rear member or shell 2 to be drawn forwardly so as to insure a tight joint between the front edge thereof and the rear edge of the front member 1.

10 designates, generally, the sealed-beam lighting unit which includes a lens 11, a reflector 12, and a circumferential bead 13, and for the present purpose this bead may be considered as including a shoulder 14 that is immediately adjacent the rear side of the bead. The lighting unit is provided with a locating lug 15 in the angle between the bead and reflector. Metal connectors 16 are incorporated in the lighting unit and have electrical connection with the terminals of the enclosed filament (not shown). A so-called "hot wire" or conductor 20 is fastened, by a screw 21, to one of the connectors 16, while the other connector has attached to it, by a screw 22, a ground wire 23. The former wire 20, is shown as leading out through an aperture 24 in the rear lower portion of the shell 2, while the end of the ground wire 23, opposite that connected to the lamp, is attached by a screw 25, to a boss 26 that projects inwardly from the rear of the shell 2 adjacent the bottom thereof. Shown as clamped between the terminal of the ground wire and the boss 26 is an apertured end of a strap metal finger 29 that engages the head of a so-called carriage bolt 30 that is extended through a hole in the bottom 32 of the shell. A square portion 33 of the bolt 30 occupies a similarly shaped opening in the bottom 32 so as to hold the bolt against turning. The under surface of the bottom 32 has a substantially semi-spherical socket that receives a complementarily shaped part of a mounted arm or bracket 35, said part being clamped to said bottom by a nut 36 that is applied to the screw 30, with suitably shaped washers interposed between the nut and the cupped wall of the bracket. The opening in the bracket is enough larger than the diameter of the bolt 30 to permit limited angular adjustment between the casing and the bracket for the purpose of "aiming" the lamp, the engaging surfaces of the casing and bracket being roughened or serrated so as to avoid accidental slippage when the nut 36 is drawn up tightly to clamp the casing to the bracket. The connection just described between the casing and bracket permits the latter to be swung about an axis substantially normal to that of the lighting unit to any position within a complete circle with respect to the casing, so as to adapt the lamp to various mountings.

Prior to attaching the front casing member 1 to the rear member or shell 2, the lighting unit 12 is connected to the member 1 by means of clamps 40, one of which is shown in perspective in Fig. 5. For practical purposes, these clamps are identical, and therefore interchangeable, and each is made of a piece of resilient sheet metal that is formed at one end with a strut 41, and at the other with bearing parts 42. The end of the piece of metal that forms the bearing parts is provided with a notch 43. Intermediate its ends, said piece of metal is arched and has an aperture 44.

In mounting the lighting unit, it is arranged with the front side of the bead 13 against the inner edge or bearing surface of a reentrant portion 45 of the casing member 1 which surrounds the relatively large circular opening in said member, and the clamps 40 are then emplaced with their struts 41 on rearwardly facing ledges 46 of the casing member 1 and their bearing parts 42 engaging the lighting unit at the rear side of the bead 13. Screws 47 are projected through the apertures 44 of the clamps and are screwed into threaded holes in bosses 48 that extend rearwardly from the member 1 inwardly of the ledges 46. The notch 43 in one of the clamps receives the locating lug 15 of the lighting unit.

It will be observed that the overhang of the reentrant portion 45 of the casing member 1 is greater at the top than at the bottom, and this is for the obvious purpose of deflecting upward glare from the lighting unit in a forward direction.

Having thus described my invention, what I claim is:

1. In combination, a lamp casing for use with a sealed-beam lighting unit, which unit includes a lens and a reflector and is characterized by a circumferential bead intermediate the lens and reflector, said casing comprising a front frame-like member and a rear shell-like member, said front member having an opening for the accommodation of the lens of said unit, and a bearing surface surrounding said opening and wherewith the front of said bead engages, the frame-like member being formed on its interior adjacent each side of said opening in outwardly spaced relation to said bearing surface with a rearwardly facing ledge that is relatively broad in a circumferential direction and is narrow in a radial direction with reference to said opening, a boss extending rearwardly from the frame-like member between each ledge and the aforesaid bearing surface, said boss having a threaded bore that opens through its rear end and stops short of the front surface of said frame-like member, two clamps, one for cooperation with each ledge, each clamp comprising a piece of sheet metal of a width approximating the breadth of a ledge and formed at its outer end to provide a forwardly and outwardly inclined strut for engagement with the corresponding ledge and adjacent its inner end to engage the rear side of the circumferential bead of the lighting unit and to overlie the contiguous portion of said reflector, the clamp having an aperture intermediate its ends, a screw extended through said aperture and threaded into the bore of said boss, the screw having a head between which and the aforesaid ledge and last mentioned parts of the lighting unit the clamp is compressed, the clamp being supported exclusively by said screw, said ledge and said parts of the lighting unit, and means detachably securing the members of the lamp casing together.

2. The combination defined by claim 1, wherein the inner end of one of said clamps is provided with a notch; the lighting unit including a locating lug adapted to be received by said notch.

3. The combination defined by claim 1, wherein said clamps are identical and interchangeable, each having a notch at its inner end; the lighting unit including a locating lug adapted to be received by the notch of one of the clamps.

DAVID M. MORGENSTERN.

REFERENCES CITED

The following references are of record in the file of this patent:

UNITED STATES PATENTS

| Number | Name | Date |
| --- | --- | --- |
| 1,242,186 | Hawthorne | Oct. 9, 1917 |
| 1,515,156 | Michel | Nov. 11, 1924 |
| 1,652,192 | Bamford | Dec. 13, 1927 |
| 2,123,125 | Trippe | July 5, 1938 |
| 2,307,739 | Bahr | Jan. 12, 1943 |
| 2,344,716 | Mears | Mar. 21, 1944 |